United States Patent
Horie et al.

(10) Patent No.: US 7,499,070 B2
(45) Date of Patent: Mar. 3, 2009

(54) METHOD OF DIAGNOSING A STATE OF A HORIZONTAL SYNCHRONIZING SIGNAL FOR AN OPTICAL SCANNER

(75) Inventors: Yasuyuki Horie, Ibaraki (JP); Toru Kikuchi, Ibaraki (JP)

(73) Assignee: Ricoh Printing Systems, Ltd., Tokyo (JP)

( * ) Notice: Subject to any disclaimer, the term of this patent is extended or adjusted under 35 U.S.C. 154(b) by 373 days.

(21) Appl. No.: 10/831,301

(22) Filed: Apr. 26, 2004

(65) Prior Publication Data

US 2004/0223047 A1    Nov. 11, 2004

(30) Foreign Application Priority Data

May 8, 2003   (JP)   ............ P.2003-129796
Feb. 6, 2004  (JP)   ............ P.2004-030403

(51) Int. Cl.
  *B41J 2/435*   (2006.01)
  *B41J 2/47*    (2006.01)

(52) U.S. Cl. ............................ 347/235; 347/250

(58) Field of Classification Search ......... 347/233–237, 347/246–250, 116, 225, 229; 358/481
See application file for complete search history.

(56) References Cited

U.S. PATENT DOCUMENTS 4,771,337 A * 9/1988 Endo et al. .......... 358/481
5,039,998 A * 8/1991 Seto .................. 347/247
5,115,256 A * 5/1992 Miyagi et al. ........ 347/249
5,745,154 A * 4/1998 Nishizawa ........... 347/250
5,852,461 A * 12/1998 Noguchi ............. 347/116
6,064,419 A * 5/2000 Uchiyama ........... 347/250
2002/0135669 A1* 9/2002 Ueno ................. 347/250

FOREIGN PATENT DOCUMENTS

JP    02143479 A   *  6/1990
JP    2000111817 A *  4/2000
JP    2000-309117      11/2000
JP    2003025628 A *  1/2003

* cited by examiner

*Primary Examiner*—Hai C Pham
(74) *Attorney, Agent, or Firm*—McGinn IP Law Group, PLLC

(57) ABSTRACT

A method of diagnosing a state of a horizontal synchronizing signal is provided for an optical scanner, which includes a rotary polygon mirror having a rotation sensor, a control clock competing with a signal of the rotation sensor to control the rotary polygon mirror to a constant speed, a laser beam illuminating the rotary polygon mirror to be used in a scanning operation, and a scanning beam detector detecting the laser scanning beam at a prescribed position and outputting a horizontal synchronizing signal to trigger a control of the scanner. The method includes using the optical scanner, and presetting an effective period of outputting the horizontal synchronizing signal by counting the control clock for the rotary polygon mirror, the counting being triggered by a previous horizontal synchronizing signal.

14 Claims, 5 Drawing Sheets

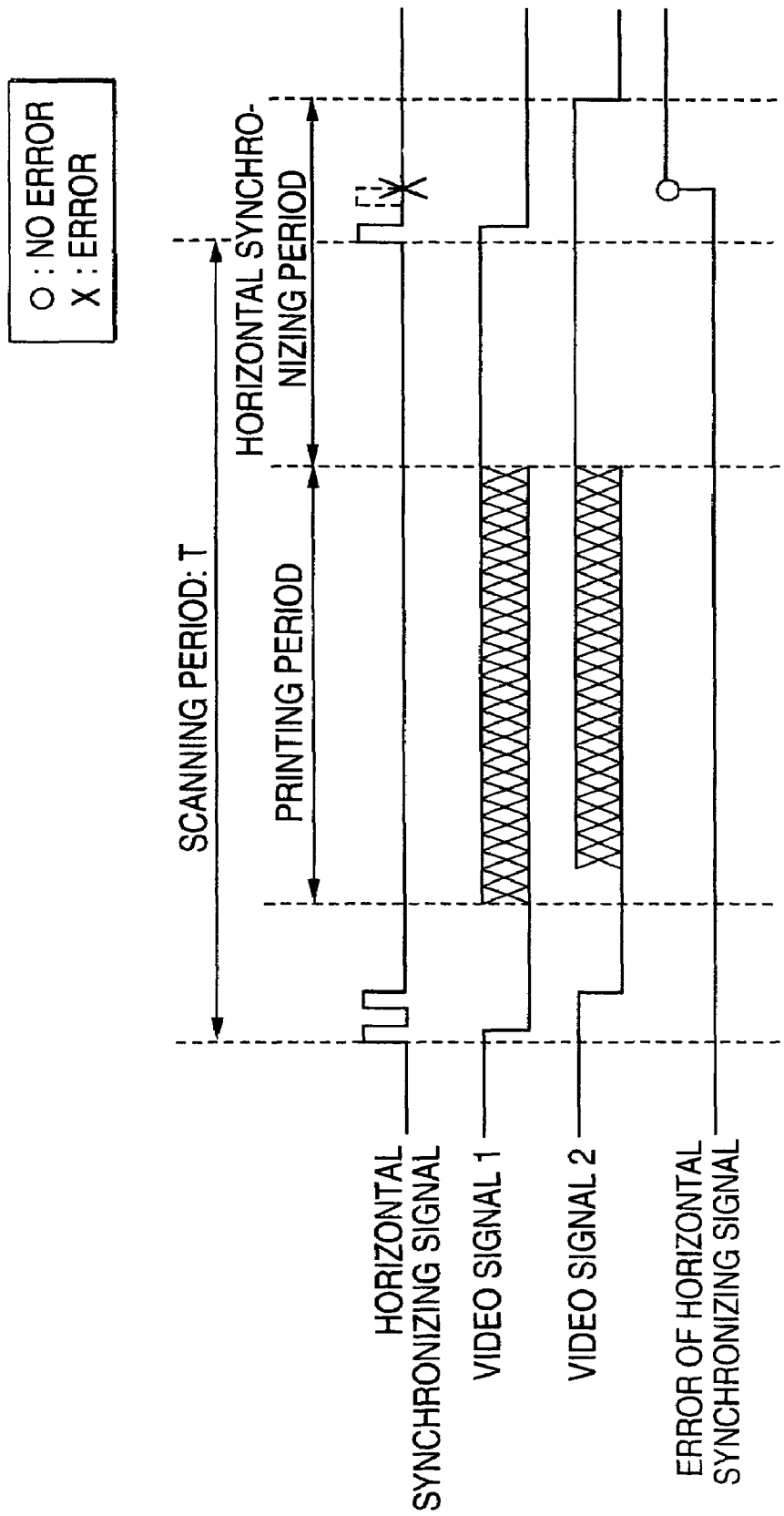

METHOD OF DIAGNOSING A STATE OF A HORIZONTAL SYNCHRONIZING SIGNAL FOR AN OPTICAL SCANNER

BACKGROUND OF THE INVENTION

1. Field of the Invention

The present invention relates to an optical scanner which uses a scanning beam to scan a photosensitive member.

2. Background Art

Hereinafter, the conventional art will be described with reference to the drawings.

FIG. 1 shows the configuration of an optical scanner which is used in an electrophotographic apparatus typified by a laser printer, a copier, etc. An n number of laser beams which are emitted from an n number of laser beam sources 10 are reflected by a rotary polygon mirror 20 to be passed through an Fθ lens 30, and then illuminate the surface of a photosensitive drum 40 with scanning the surface. At this time, character data and graphic data which have been converted to dot images are formed as a video signal (ON/OFF signals for the laser beams), and portions which are illuminated by the laser beams, and those which are not illuminated are formed in the surface of the photosensitive drum 40, thereby forming a so-called electrostatic latent image.

The rotary polygon mirror 20 is controlled so as to be rotated at a constant speed by causing an output of a rotation sensor for the mirror to compete with a control clock.

A scanning beam detector 50 is disposed at a position which is optically equivalent with that of the photosensitive drum 40, and which is illuminated with the laser beams in advance of the photosensitive drum 40 in the main scanning direction. The detector produces a horizontal synchronizing signal to determine a position where, when the scanning beams are to scan the photosensitive drum 40, transmission of the dot image from a host controller is to be started.

FIG. 5 is a timing chart of video signals and the horizontal synchronizing signal in the case where two laser beam sources (n=2) are used. Here, n denotes a number of laser beam sources. In a horizontal synchronizing period, first, the video signals are set to the ON state. In this state, the laser beams emitted from the laser beam sources 10 are reflected by the rotary polygon mirror 20 to be passed through the Fθ lens 30, and then enter the scanning beam detector 50, so that one horizontal synchronizing signal is output for each of the laser beams. The video signals respectively corresponding to the horizontal synchronizing signals are turned OFF.

In the above configuration, n pulses of the horizontal synchronizing signal are required for one scanning operation. In the cases where the number of the pulses of the horizontal synchronizing signal is smaller than n, where the number is larger than n, and where the horizontal synchronizing signal is output at a timing different from a prescribed value, the video signals are output at an incorrect timing during a printing period which is subsequent to the horizontal synchronizing period, and hence an electrostatic latent image cannot be correctly formed. In these cases, therefore, the host controller issues a warning and controls the operations to be interrupted.

Conventionally, a printer is known in which communication with an engine is started after elapse of a predetermined time from a periodic signal, and, based on the status obtained as a result of the communication, it is judged whether a synchronizing signal is not output because of the end of pages to be printed or because of occurrence of an abnormal state in the printer engine (for example, see JP-A-2000-309117). However, a configuration which, when an abnormality of a horizontal synchronizing signal is detected, can recognize the cause of the abnormality is not known.

SUMMARY OF THE INVENTION

When an abnormality of the pulse number of a horizontal synchronizing signal is detected, it is possible to know that the status is in which one of the states where the horizontal synchronizing signal is smaller than n pulses, where the horizontal synchronizing signal is larger than n pulses, and where the horizontal synchronizing signal is output at a timing different from a prescribed one. However, it is impossible to know that the abnormality is caused by which one of the states where a laser beam source does not emit a laser beam, and where the horizontal synchronizing signal vanishes in the laser beam path or the transmission path.

It is an object of the invention to know the cause of a detected abnormality of a horizontal synchronizing signal.

In order to solve the problem, according to an aspect of the invention, there is provided a method of diagnosing a state of a horizontal synchronizing signal for an optical scanner, which includes a rotary polygon mirror having a rotation sensor, a control clock competing with a signal of the rotation sensor to control the rotary polygon mirror to a constant speed, a laser beam illuminating the rotary polygon mirror to be used in a scanning operation, and a scanning beam detector detecting the laser scanning beam at a prescribed position and outputting a horizontal synchronizing signal to trigger a control of the scanner. The method includes using the optical scanner, and presetting an effective period of outputting the horizontal synchronizing signal by counting the control clock for the rotary polygon mirror, the counting being triggered by a previous horizontal synchronizing signal.

According to another aspect of the invention, there is provided a method of diagnosing a state of a horizontal synchronizing signal for an optical scanner, which includes a plurality of laser beams, a video signal for turning ON/OFF the laser beams, a counter counting a number of pulses in a horizontal synchronizing signal, a video signal state checking portion checking an ON/OFF state of the video signal, and a storage device, and conducts a horizontal synchronizing operation of turning ON the laser beams in advance to generate the horizontal synchronizing signal, and turning OFF the laser beams with being triggered by reception of the horizontal synchronizing signal. The method includes presetting an effective period of outputting the horizontal synchronizing signal by counting of a control clock for a rotary polygon mirror, the counting being triggered by a previous horizontal synchronizing signal, and storing in the storage device the number of the horizontal synchronizing signal and the ON/OFF state of the video signal in the effective period.

BRIEF DESCRIPTION OF THE DRAWINGS

The present invention may be more readily described with reference to the accompanying drawings:

FIG. 5 is a timing chart showing the conventional art.

DETAILED DESCRIPTION OF THE PREFERRED EMBODIMENTS

Figure 1:
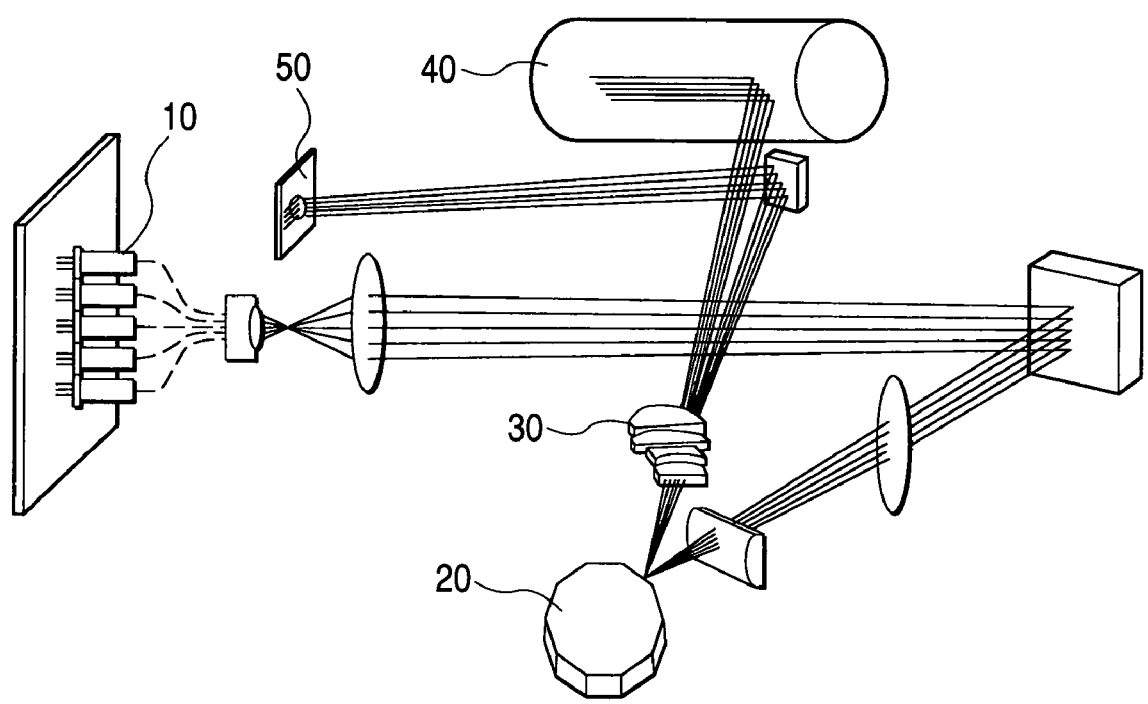
FIG. 1 is a diagram showing the configuration of a usual optical scanner.

Hereinafter, an embodiment of the invention will be described with reference to the accompanying drawings. The basic configuration of an optical scanner which is useful in the invention is identical with the configuration of FIG. 1 which has been described in the paragraph of the conventional art, and hence its description is omitted.

Figure 2:
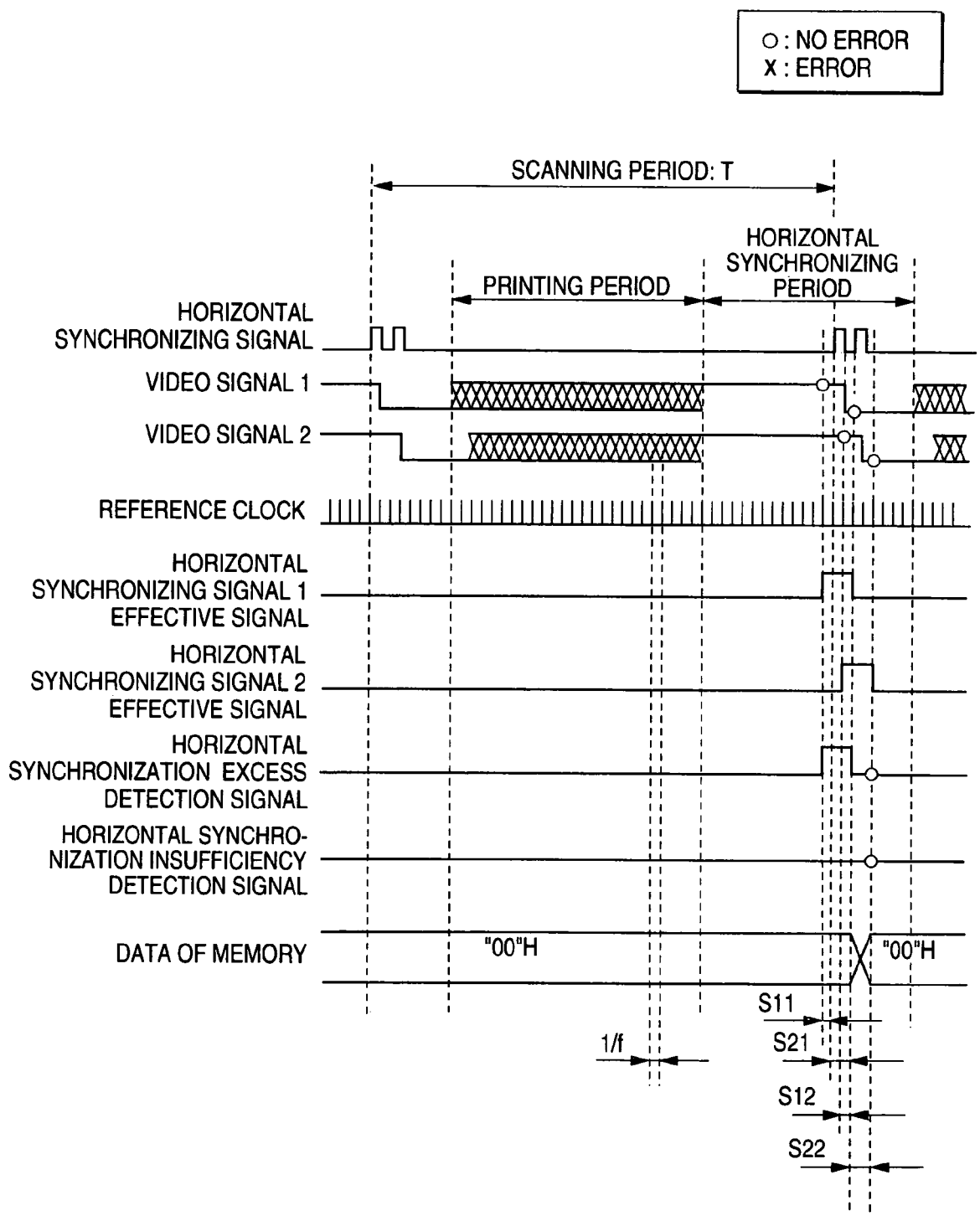
FIG. 2 is a timing chart showing an embodiment of the invention.

FIG. 2 is a timing chart showing an embodiment of the invention in the case where two laser beam sources (n=2) are used. Referring to FIG. 2, a horizontal synchronizing signal k effective signal (k=1 or 2) is set ON during a period which is preset by counting of the control clock for the rotary polygon mirror triggered by a previous horizontal synchronizing signal. When p pulses of the control clock of a frequency f (Hz) are generated for one rotation of the rotary polygon mirror having m faces, the time period T from a timing when the horizontal synchronizing signal k corresponding to the laser beam k is output, to that when the horizontal synchronizing signal k is output in the next scanning period is equal to the scanning period, and given by Ex. (1).

[Ex. 1]

$$T = p/(m \times f) \qquad (1)$$

Therefore, it is expected that, when p/m pulses of the control clock are output after the output of the horizontal synchronizing signal, the next horizontal synchronizing signal is output.

At a timing which advances by a tolerance time S1k the timing when p/m pulses of the control clock are output after the output of the horizontal synchronizing signal for the laser beam k in the previous scanning period, the horizontal synchronizing signal k effective signal is set ON, the logical level of the video signal k corresponding to the laser beam k is detected, and a horizontal synchronization insufficiency detection signal is set ON. In the simplest manner, the tolerance time S1k is set to be equal to one reference pulse, i.e., S1k=1/f. It is a matter of course that the effect of the invention is greater as the tolerance time S1k is shorter. In a normal state, the video signal n is set ON.

Next, at a timing when a tolerance time S2k elapses after the horizontal synchronizing signal for the laser beam k in the previous scanning period is output, the horizontal synchronizing signal k effective signal is set OFF, and the logical level of the video signal k is again detected. In the simplest manner, the tolerance time S2k is set to a time which is obtained by adding the pulse width w of the horizontal synchronizing signal to one reference pulse, i.e., S2k=1/f+w. It is a matter of course that the effect of the invention is greater as the tolerance time S2k is shorter. In a normal state, the video signal k is set OFF.

Furthermore, pulses of the horizontal synchronizing signal which are output during a period when a logical sum of an n number of horizontal synchronizing signal k effective signals is in the ON state are counted. When the logical sum becomes the OFF state, the number of the horizontal synchronizing signals is detected. If the number is smaller than n, the horizontal synchronization insufficiency detection signal is set ON, and, if the number is larger than n, a horizontal synchronization excess detection signal is set ON. In a normal state or if the number of the horizontal synchronizing signals is n, both the signals are set OFF when the horizontal synchronizing period is ended.

Figure 3:
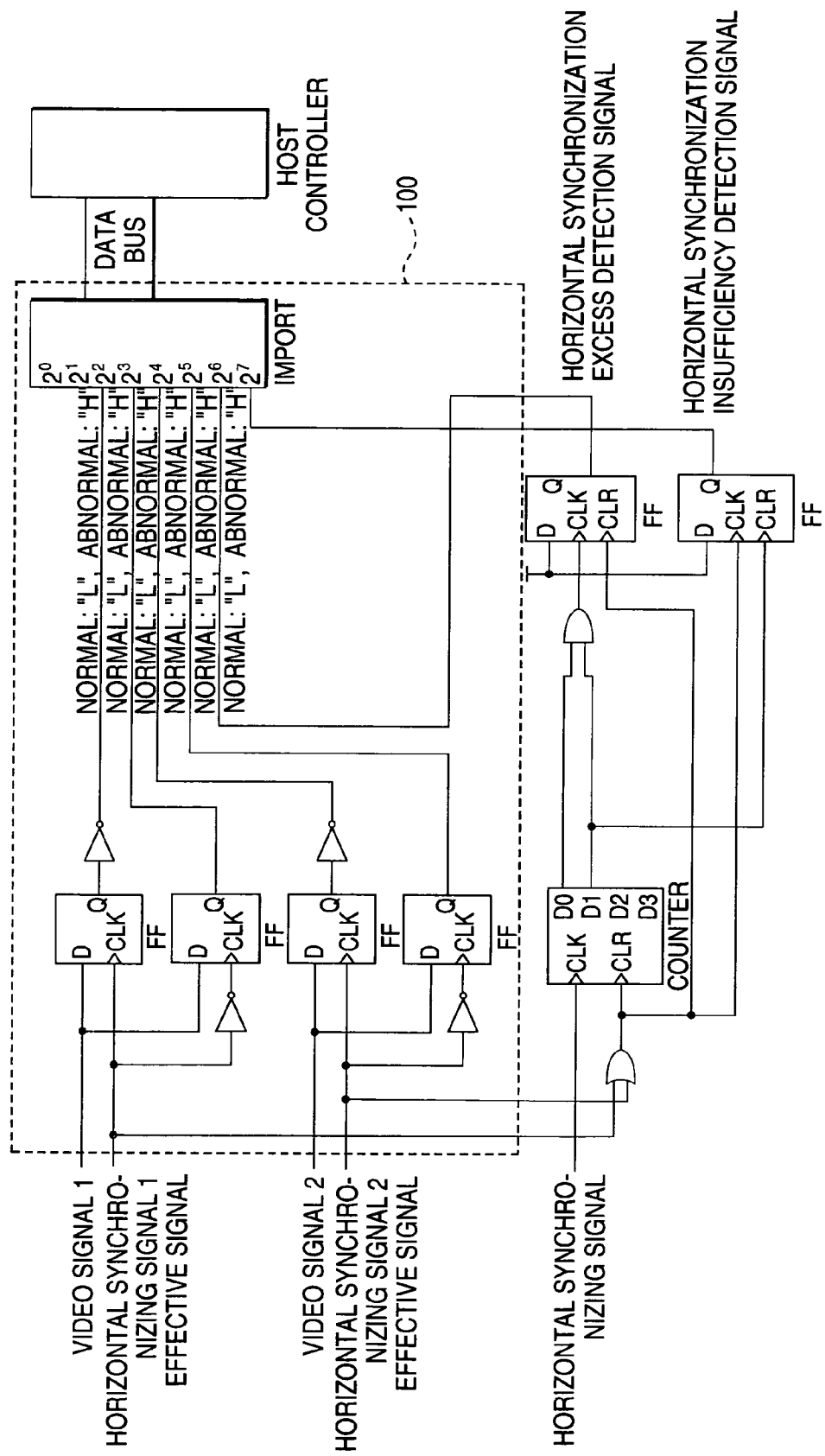
FIG. 3 is a circuit diagram showing the embodiment of the invention.

FIG. 3 is a circuit diagram showing the embodiment of the invention in the case where two laser beam sources (n=2) are used. When the horizontal synchronizing signal k effective signal (k=1 or 2) is set ON, the horizontal synchronization insufficiency detection signal is set ON, and the horizontal synchronization excess detection signal is set OFF, thereby clearing a counter. Each time when the horizontal synchronizing signal is output, the counter is updated. When the value of the counter is 2, the horizontal synchronization insufficiency detection signal is set OFF, and, when the value of the counter is 3, the horizontal synchronization excess detection signal is set ON. When the horizontal synchronizing signal k effective signal is set ON, a video signal state checking portion 100 latches the video signal k, and, when the horizontal synchronizing signal k effective signal is then set OFF, the video signal k is latched by another latch circuit. After all the horizontal synchronizing signal k effective signals are set OFF, the host controller reads these data to check whether all the signals are OFF or "00"H is obtained or not. If "00"H is not obtained, these data are stored into a memory.

Figure 4:
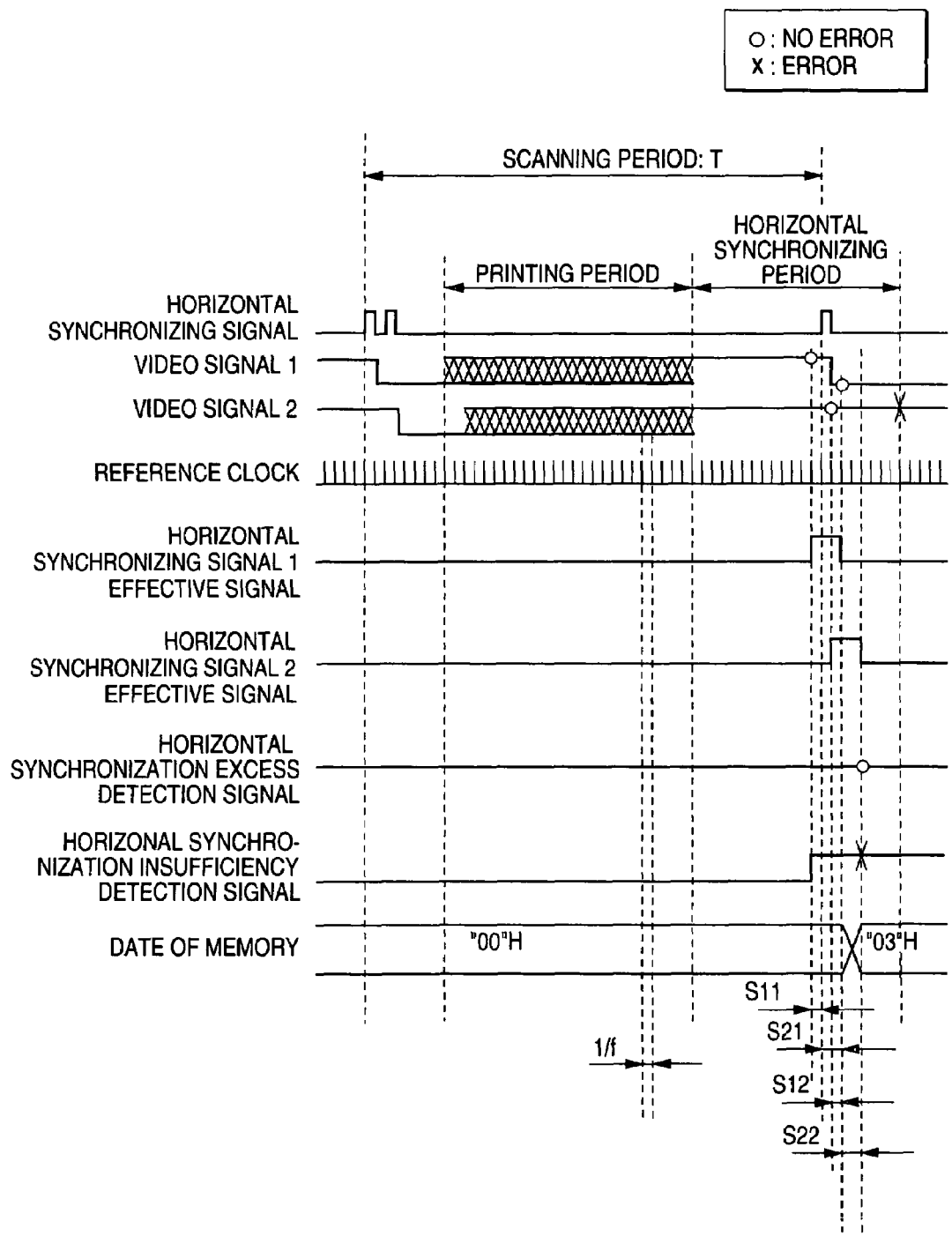
FIG. 4 is a timing chart showing the embodiment of the invention where only one horizontal synchronizing signal is detected.

FIG. 4 is a timing chart showing the embodiment of the invention in the case where two laser beam sources (n=2) are used and only one horizontal synchronizing signal is detected. In this case, the host controller stores "03"H into the memory, and informs the user of "the video signal 1 was changed from ON to OFF, but the video signal 2 remains ON, and detection of two horizontal synchronizing signals failed."

In the invention, the scanning beam detector 50 (horizontal synchronizing signal sensor) is configured so as to detect laser beams which has been reflected by the rotary polygon mirror, and the detection result of the detector depends on the rotation of the rotary polygon mirror. When a control clock for the rotary polygon mirror which determines the rotation of the rotary polygon mirror is used, therefore, it is possible to predict more correctly the output of the scanning beam detector.

According to the invention, an effective period of outputting the horizontal synchronizing signal is preset by counting of the control clock for the rotary polygon mirror triggered by a previous horizontal synchronizing signal, and the number of horizontal synchronizing signals and the ON/OFF state of the video signal during the effective period are held or informed. As a result, it is possible to know the cause of a detected abnormality of the horizontal synchronizing signal.

What is claimed is:

1. A method of diagnosing a state of a horizontal synchronizing signal for an optical scanner, the optical scanner including:
    a rotary polygon mirror having a rotation sensor;
    a control clock competing with a signal of the rotation sensor to control the rotary polygon mirror to a constant speed;
    a laser beam which illuminates the rotary polygon mirror to be used in a scanning operation;
    a scanning beam detector which detects the laser scanning beam at a prescribed position, the scanning beam detector outputting a horizontal synchronizing signal to trigger a control of a scanner;
    a video signal state checking portion which checks an ON/OFF state of the video signal;
    a counter which counts a number of pulses of the horizontal synchronizing signal; and
    a storage device which stores data,
    the method comprising:
    presetting an effective period of outputting the horizontal synchronizing signal by counting the control clock for the rotary polygon mirror, the counting being triggered by a previous detected horizontal synchronizing signal;

counting the number of pulses of the horizontal synchronizing signal every effective period of outputting the horizontal synchronizing signal;

storing, in the storage device, the number of pulses of the horizontal synchronizing signal and the ON/OFF state of the video signal in the effective period;

checking the data including the number of pulses of the horizontal synchronizing signal and the ON/OFF state of the video signal stored in the storage device when detecting abnormality of the horizontal synchronizing signal so as to recognize a cause of the abnormality; and determining a cause of a detected abnormality of the horizontal synchronizing signal based on a result of the checking the data.

2. The method according to claim 1, wherein p pulses of the control clock of a frequency f are generated for one rotation of the rotary polygon mirror.

3. The method according to claim 2, wherein the polygon mirror has m faces, and wherein p/m pulses of the control clock are output from the output of one horizontal synchronizing signal to an output of a next horizontal synchronizing unit.

4. The method according to claim 3, further comprising:

detecting a logical level of a video signal corresponding to the laser beam when a horizontal synchronizing signal effective signal is set to an ON state.

5. The method according to claim 4, further comprising:

setting a horizontal synchronization insufficiency detection signal to an ON state.

6. The method according to claim 5, further comprising:

setting the horizontal synchronizing signal effective signal to an OFF state after a tolerance time elapses from when the horizontal synchronizing signal is output.

7. The method according to claim 6, wherein the logical level of a video signal corresponding to the laser beam is detected.

8. The method according to claim 1, wherein said determining a cause of the detected abnormality comprises determining whether the detected abnormality of the horizontal synchronizing signal is caused by a state where a laser beam source does not emit the laser beam or a state where the horizontal synchronizing signal vanishes in a laser beam path or a transmission path.

9. The method according to claim 1, wherein said laser beam comprises one of a plurality of laser beams.

10. The method according to claim 9, further comprising:

counting the pulses of the horizontal synchronizing signal that are output during a period when a logical sum of an n number of the horizontal synchronizing effective signals is in the ON state.

11. The method according to claim 10, wherein the number of pulses of horizontal synchronizing signals is deleted when the logical sum becomes the OFF state.

12. The method according to claim 11, further comprising:

setting the horizontal synchronization insufficiency detection signal to an ON state when the number of pulses of horizontal synchronization signals is less than n; and setting a horizontal synchronization excess detection signal to an ON state when the number of pulses of horizontal synchronization signals is greater than n.

13. The method according to claim 11, further comprising:

setting the horizontal synchronization insufficiency detection signal to an OFF state when the number of pulses of horizontal synchronization signals is n; and setting a horizontal synchronization excess detection signal to an OFF state when the number of pulses of horizontal synchronization signals is n.

14. The method according to claim 11, further comprising:

setting the horizontal synchronization insufficiency detection signal to an OFF state when a normal state is detected; and setting a horizontal synchronization excess detection signal to an OFF state when the normal state is detected.

* * * * *